US010110760B2

(12) United States Patent
Tezuka

(10) Patent No.: US 10,110,760 B2
(45) Date of Patent: Oct. 23, 2018

(54) MEDIUM FEEDING DEVICE AND IMAGE READING APPARATUS

(71) Applicant: SEIKO EPSON CORPORATION, Tokyo (JP)

(72) Inventor: Seiji Tezuka, Kitakyushu (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/451,801

(22) Filed: Mar. 7, 2017

(65) Prior Publication Data
US 2017/0279982 A1 Sep. 28, 2017

(30) Foreign Application Priority Data
Mar. 22, 2016 (JP) ................... 2016-056606

(51) Int. Cl.
*H04N 1/04* (2006.01)
*H04N 1/00* (2006.01)

(52) U.S. Cl.
CPC ....... *H04N 1/00315* (2013.01); *H04N 1/0032* (2013.01); *H04N 2201/006* (2013.01); *H04N 2201/0055* (2013.01); *H04N 2201/0081* (2013.01)

(58) Field of Classification Search
CPC ...... G03G 15/00; G03G 15/605; G06F 3/044; G06K 15/00; G06K 15/40; G06K 19/072; G06K 19/0723; G06K 19/07716; G06K 19/07718; G06K 19/07722; H04N 1/00; H04N 1/00496; H04N 1/00557; H04N 1/00559
USPC .......... 358/1.15, 1.1, 497; 156/277; 235/492
See application file for complete search history.

(56) References Cited

U.S. PATENT DOCUMENTS

| 6,793,301 | B2* | 9/2004 | Kaburagi | B41J 29/393 347/109 |
|---|---|---|---|---|
| 8,113,727 | B2* | 2/2012 | Niwa | B41J 3/4075 400/613 |
| 8,994,997 | B2* | 3/2015 | Chen | G06K 15/40 358/1.1 |
| 9,649,865 | B2* | 5/2017 | Ito | B41J 29/13 |
| 2003/0233129 | A1* | 12/2003 | Matos | A61B 5/0006 607/5 |
| 2006/0250639 | A1* | 11/2006 | Lapstun | G06K 9/228 358/1.15 |
| 2008/0297830 | A1* | 12/2008 | Sewell | H04N 1/00278 358/1.15 |
| 2009/0002746 | A1* | 1/2009 | Niwa | B41J 3/4075 358/1.15 |
| 2014/0029050 | A1* | 1/2014 | Chen | G06K 15/40 358/1.15 |
| 2014/0043392 | A1* | 2/2014 | Suzuki | B41J 2/135 347/20 |

(Continued)

FOREIGN PATENT DOCUMENTS

JP 2015-055902 A 3/2015

Primary Examiner — Negussie Worku
(74) Attorney, Agent, or Firm — Workman Nydegger

(57) ABSTRACT

A medium feeding device includes a housing, a medium feeding portion that is provided in an inner portion of the housing and delivers sheets of paper, a medium mounting member on which a medium is mounted, and a wireless communication portion that performs wireless communication with another communication terminal, in which the wireless communication portion is provided in the medium mounting member.

6 Claims, 7 Drawing Sheets

(56) References Cited

U.S. PATENT DOCUMENTS

| | | | |
|---|---|---|---|
| 2015/0146251 A1* | 5/2015 | Ueyama | G06K 15/12 358/1.15 |
| 2016/0059532 A1* | 3/2016 | Thorogood | G06K 19/07722 235/492 |
| 2017/0033543 A1* | 2/2017 | Yokoyama | H01B 1/12 |

* cited by examiner

MEDIUM FEEDING DEVICE AND IMAGE READING APPARATUS

BACKGROUND

1. Technical Field

The present invention relates to a medium feeding device that feeds a medium, and an image reading apparatus provided with a medium feeding device.

2. Related Art

Among scanners, as an example of an image reading apparatus, there are apparatuses that are configured so that wireless communication such as near field communication (NFC) and Wi-Fi, is performed.

In addition, in a scanner, an automatic document feeding device (also referred to as an auto document feeder (ADF)) is provided as a medium feeding device, and there are cases in which a scanner is configured to perform automatic feeding and reading of a plurality of documents.

For example, JP-A-2015-55902 discloses a multifunction peripheral that is provided with an ADF in an upper portion thereof, and is configured to perform near field communication.

Additionally, near field type wireless communication is the kind of near field communication, and the communication area is of an extent of approximately a few centimeters to 1 meter. For example, a user performs setting of the scanner, the transmission of image data from a mobile terminal to the scanner, the transmission to the scanner of information recorded in an IC incorporated in a card, and the like using the near field communication.

In JP-A-2015-55902, an NFC module as a communication portion for performing wireless communication, is provided in the inner portion of the ADF. In this manner, in a case in which the communication portion is provided in the inner portion of a device, there are cases in which directivity and communication disturbances occur in the wireless communication function.

SUMMARY

An advantage of some aspects of the invention is to provide a medium feeding device and an image reading apparatus that suppresses directivity and communication disturbances in a case of performing wireless communication, and can improve the usability of an image reading apparatus for a user.

According to an aspect of the invention, there is provided a medium feeding device including a housing, a medium feeding portion that is provided in an inner portion of the housing and delivers a medium, a medium mounting member on which the medium is mounted, and a wireless communication portion that performs wireless communication with another communication terminal, in which the wireless communication portion is provided in the medium mounting member.

In this case, as a result of providing the wireless communication portion in the medium mounting member, at least a portion of which is positioned outside the housing when the medium is mounted, it is possible to perform disposition in a position in which there are few other constituent members that block wireless communication between the wireless communication portion and another communication terminal, and therefore, it is possible to suppress directivity of wireless communication in the wireless communication portion.

In addition, in a case of a medium (for example, a card, or the like, having a built-in IC chip in which wireless communication with a wireless communication portion is possible) in which it is possible for the other communication terminal to be mounted on the medium mounting member, since it is possible to perform wireless communication with the medium by merely setting the medium on the medium mounting member, the usability or the convenience for a user is improved.

In the medium feeding device, it is preferable that the medium mounting member be provided with a pair of edge guides that guides both side edges of the medium in a width direction that intersects a feeding direction, and that the wireless communication portion be provided inside a guiding region of the edge guides in the feeding direction, the guiding region being between the pair of edge guides in the width direction.

In this case, since the wireless communication portion is provided inside the guiding region of the edge guides in the feeding direction, which is between the pair of edge guides in the width direction, it is possible to more reliably perform wireless communication when the medium, as the other communication terminal, is set on the medium mounting member.

In the medium feeding device, it is preferable that either one of the edge guides be provided with a sliding portion that is capable of sliding on a mounting surface of the medium mounting member, on an inner side of the corresponding edge guide, and the wireless communication portion is provided in the sliding portion.

In this case, since the wireless communication portion is provided in the sliding portion of the edge guide, it is possible to reliably perform wireless communication even if the size of the medium, as the other communication terminal, is different.

According to another aspect of the invention, there is provided an image reading apparatus including a reading portion that reads a medium, and the medium feeding device described above, which feeds the medium toward the reading portion.

In this case, in the image reading apparatus provided with the reading portion, which reads the medium, similar operational effects to those above are obtained when the medium is fed toward the reading portion.

In the image reading apparatus, it is preferable that the image reading apparatus further include a near field communication portion as the wireless communication portion.

In this case, for example, in a case in which the other communication terminal can be mounted on the medium mounting member, and is a medium having a built-in IC chip, or the like, in which wireless communication with the near field communication portion (hereinafter, there are cases of referring to an NFC substrate) is possible, it is possible for the NFC substrate to obtain information recorded on the IC chip by merely setting the medium on the medium mounting member.

Moreover, it is possible to store read data of the medium in the image reading apparatus, and information that the NFC substrate obtains from the IC chip, in association with one another.

In the medium feeding device, it is preferable that the image reading apparatus further include a Wi-Fi module as the wireless communication portion.

In this case, in the image reading apparatus provided with the Wi-Fi module as the wireless communication portion, similar operational effects to those above are obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Example 1

Firstly, a schematic of an image reading apparatus provided with a medium feeding device according to an example of the invention will be described. In the present example, a document scanner (hereinafter, simply referred to as a scanner 1) that is capable of reading at least one surface of a front surface or a rear surface of a medium is used as an example of an image reading apparatus.

Figure 1:
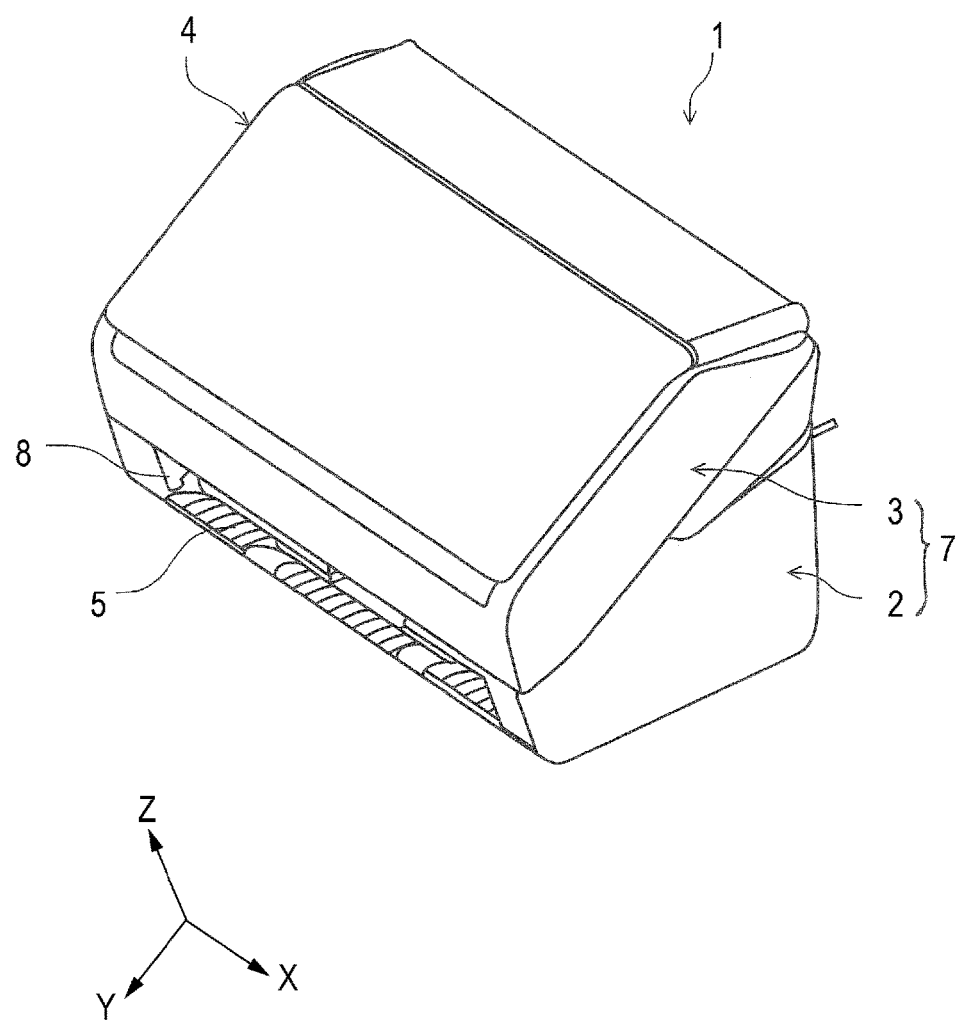
FIG. 1 is an external perspective view that shows a scanner according to Example 1.
Figure 2:
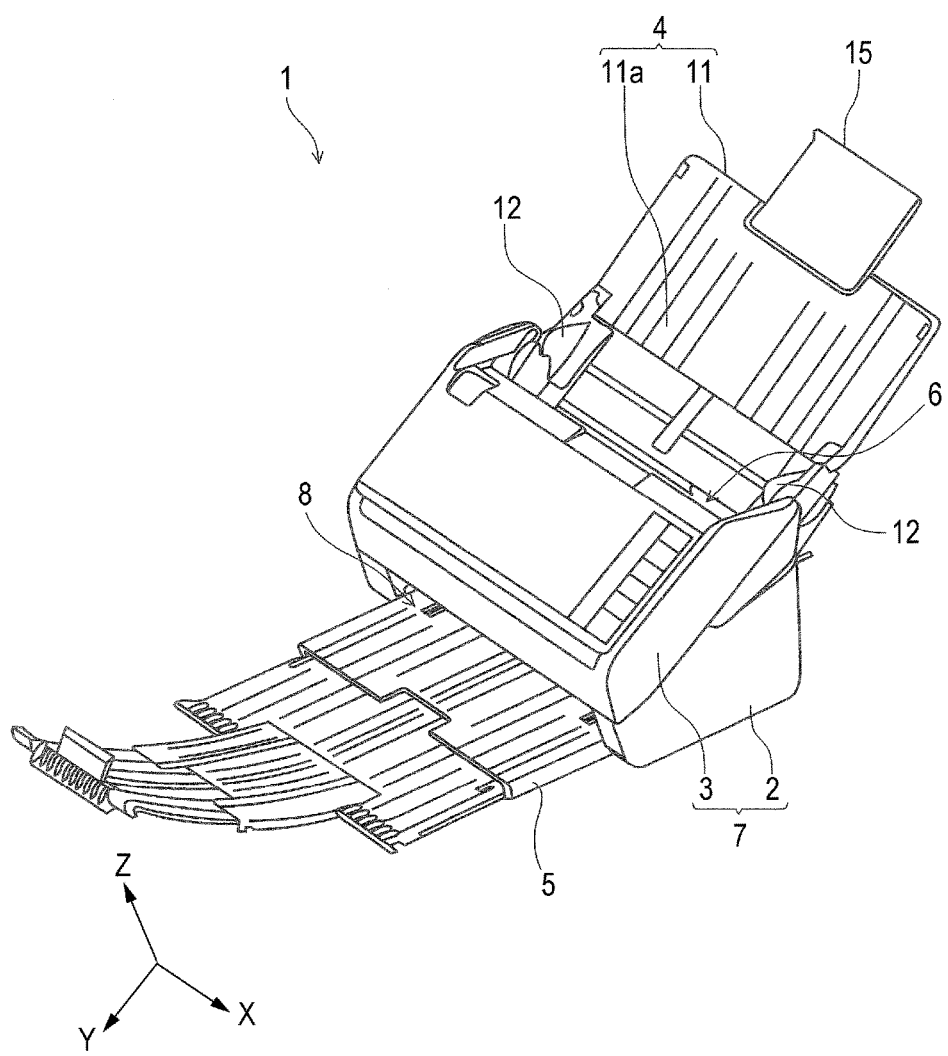
FIG. 2 is a perspective view that shows a state in which an opening/closing body is open, and a paper ejection tray is drawn out in the scanner according to Example 1.
Figure 3:
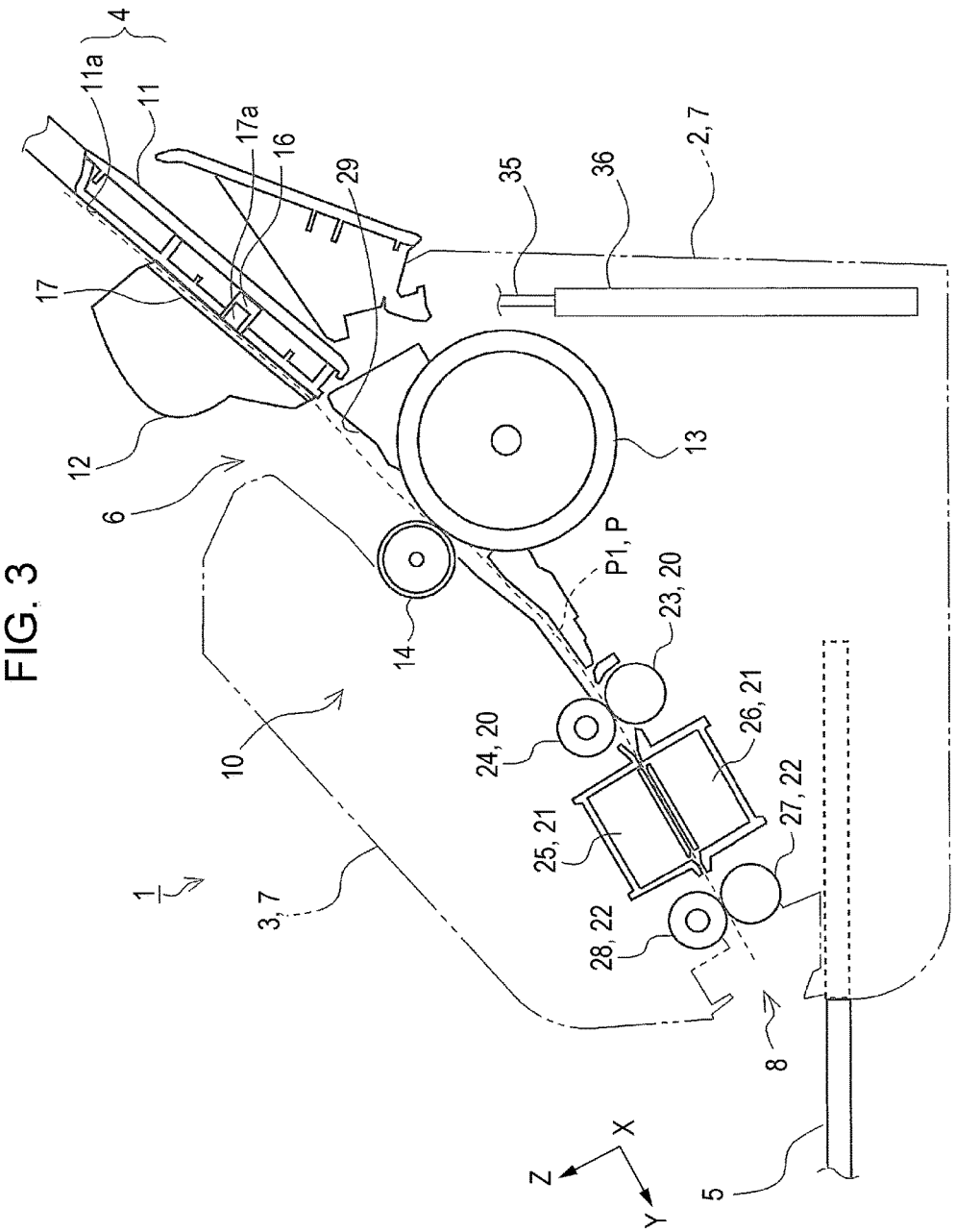
FIG. 3 is a lateral cross-sectional view that shows a paper sheet transport pathway in the scanner according to Example 1.
Figure 4:
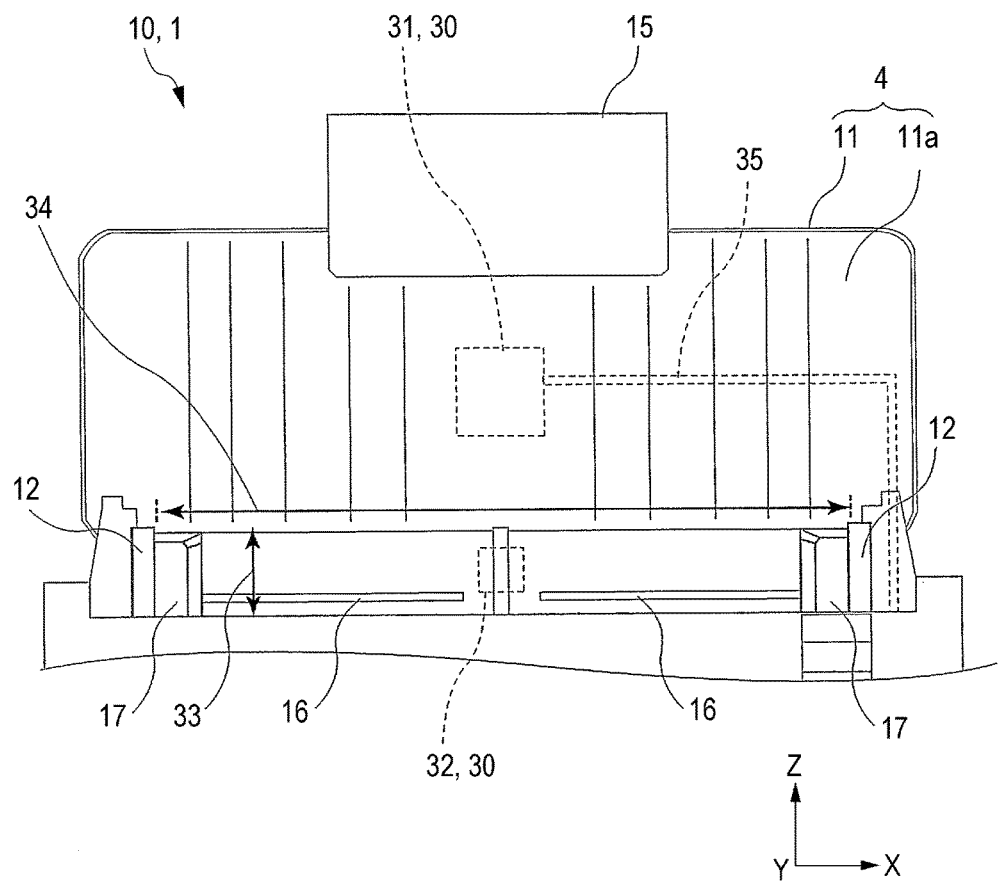
FIG. 4 is a plan view of a medium mounting member according to Example 1.

FIG. 1 is an external perspective view that shows a scanner according to Example 1. FIG. 2 is a perspective view that shows a state in which an opening/closing body is open, and a paper ejection tray is drawn out in the scanner according to Example 1. FIG. 3 is a lateral cross-sectional view that shows a paper sheet transport pathway in the scanner according to Example 1. FIG. 4 is a plan view of a medium mounting member in the scanner according to Example 1.

Outline of Scanner

The scanner 1 (FIG. 1), as the image reading apparatus, is provided with a medium feeding device 10 (FIG. 3) that feeds sheets of paper P as a "medium".

The external appearance of scanner 1 is configured by a housing 7 configured by a lower portion unit 2 and an upper portion unit 3, and an opening/closing body 4 that opens and closes the upper surface of the upper portion unit 3 and a feeding port 6 (FIG. 2), which will be mentioned later.

In addition, as shown in FIG. 4, the scanner 1 is provided with a near field communication substrate 32 (hereinafter, referred to as an NFC substrate 32) as a "wireless communication substrate 30" that performs wireless communication with another communication terminal, and a Wi-Fi substrate 31.

For example, the NFC substrate 32 performs near field communication between the scanner 1 and a mobile terminal of a user, and therefore, can perform information transmission to the mobile terminal, setting of the scanner 1 from the mobile terminal, transfer of image data, execution of scanning, and the like. In addition, it is possible to perform reading of various information, and the like, from the IC chip, which records various information.

The medium feeding device 10 (FIG. 3) is provided with the housing 7, a feeding roller 13 as a "medium feeding portion" that is provided in the inner portion of the housing 7, and a medium mounting member 11 including a mounting surface 11a on which sheets of paper P are mounted. A pair of edge guides 12 and 12 (FIG. 2 and FIG. 4) is provided on the medium mounting member 11. In addition, the NFC substrate 32 and the Wi-Fi substrate 31 are provided. Hereinafter, each constituent member of the medium feeding device 10 will be described in order.

Additionally, an X-Y-Z coordinate system that is shown in each drawing, an X direction is a paper sheet width direction, which is an apparatus width direction, and a Y direction is a paper sheet transport direction. A Z direction shows a direction that intersects the Y direction, and a direction that is roughly orthogonal to a surface of transported sheets of paper. In addition, a +Y direction side is set as an apparatus front surface side and a −Y direction side is set as an apparatus back surface side. In addition, the right side when viewed from the apparatus front surface side is set as a +X direction, and the left side is set as a −X direction. In addition, a +Z direction is set as an apparatus upper region (including an upper portion, an upper surface, and the like), and the −Z direction is set as an apparatus lower region (including a lower portion, a lower surface, and the like).

In addition, the scanner 1 has a configuration in which the sheets of paper P, as the medium, are transported in the +Y direction of each drawing. In the following description, a direction (the +Y direction side) in which the sheets of paper P are transported will be referred to as "downstream", and a direction (the −Y direction side) that is opposite thereto will be referred to as "upstream".

The upper portion unit 3 is attached to the lower portion unit 2 so as to be capable of revolving with respect to the lower portion unit 2 with the downstream side in a paper sheet transport direction as a revolution pivot point. The upper portion unit 3 can take on a closed state (FIG. 2) in which the upper portion unit 3 is closed with respect to the lower portion unit 2 and configures the transport pathway of sheets of paper P together with the lower portion unit 2, and an open state (not illustrated in the drawings) in which it is possible to easily perform a treatment of a paper blockage of the sheets of paper P by revealing the transport pathway of sheets of paper P as a result of revolving the upper portion unit 3 to the apparatus front surface side with respect to the lower portion unit 2.

In addition, the opening/closing body 4, which opens and closes the upper portion of the upper portion unit 3 is attached to the lower portion unit 2 so as to be capable of revolving with respect to the upper portion on the back surface side of the lower portion unit 2, and functions as the medium mounting member 11, on which the sheets of paper P are mounted in the open state (FIG. 2).

That is, the opening/closing body 4, as the medium mounting member 11, can take on a non-feeding state of covering the upper portion of the upper portion unit 3 and the feeding port 6 (refer to FIG. 2 and FIG. 3) as shown in FIG. 1, and a feeding state in which the feeding port 6 opens as a result of the opening/closing body 4 revolving to the apparatus back surface side as shown in FIG. 2 from the non-feeding state of FIG. 1 and in which the opening/closing body 4 corresponds to the medium mounting member 11, which supports the sheets of paper P fed on the inner side surface (the mounting surface 11a) inside the opening/closing body 4.

In the present example, a supplementary paper support 15 (FIG. 2 and FIG. 3) is provided on the upstream side of the medium mounting member 11. The supplementary paper support 15 is configured so as to be capable of being accommodated in and so as to be capable of being drawn out from the opening/closing body 4 formed in a hollow area. As a result of drawing out the supplementary paper support 15, since it is possible to support up to an upstream side of a sheet of paper P mounted on the medium mounting member 11, it is possible to support sheets of paper P in a stable manner even in a case in which the size (length) of a sheet of paper P is large (long).

A pair of edge guides 12 and 12 (FIG. 2 and FIG. 4), which guides both side edges in the width direction (an X axis direction) of the sheets of paper P, is provided on the medium mounting member 11. The edge guides 12 and 12 are provided so as to be capable of moving in a sliding manner in the X axis direction in accordance with the size of the sheets of paper P.

More specifically, the edge guides 12 and 12 (refer to FIG. 3 and FIG. 4) are provided with a sliding portion 17 that is capable of sliding on the mounting surface 11a of the medium mounting member 11, on the inner side thereof, and a convex portion 17a (FIG. 3) provided in a sliding groove 16, which is disposed on the mounting surface 11a of the medium mounting member 11 extending in the X axis direction, on the back surface side (the −Y side) of the sliding portion 17 moves in the X axis direction guided by the sliding groove 16.

In addition, the edge guides 12 and 12 in the present example are configured so that one edge guide 12 (for example, the −X side) moves in an opposing direction following X movement of the other edge guide 12 (the +X side).

That is, the medium mounting member 11 is configured so that paper is fed using a so-called central paper feeding technique in which the sheets of paper P are aligned in the center in the width direction.

Additionally, the medium mounting member 11 is provided in the lower portion unit 2, the downstream side (the +Y side) of the medium mounting member 11 is positioned inside the housing 7, and the upstream side (the −Y side) is positioned outside the housing 7. Further, the edge guides 12 and 12 are provided in the medium mounting member 11 in locations that are positioned outside the housing 7.

Paper Sheet Transport Pathway in Scanner

Next, the paper sheet transport pathway in the scanner 1 will be described with reference to FIG. 3. Additionally, the dotted line shown by the reference symbol P1 in FIG. 3 shows a transport pathway of sheets of paper P.

A tip end side (the downstream side) of a sheet of paper P that is set in the feeding port 6 is supported by and mounted on the mounting surface 11a of the medium mounting member 11 (the opening/closing body 4 in the open state).

It is possible to set a plurality of sheets of paper P in the feeding port 6. A plurality of sheets of paper P that are set in the feeding port 6 are delivered toward an image reading portion 21, which will be mentioned later, as a result of being fed by the medium feeding device 10. The medium feeding device 10 of the present embodiment is provided with a feeding roller 13, and a separation roller 14 that separates sheets of paper P by nipping sheets of paper P between the feeding roller 13 and the separation roller 14.

Sheets of paper P mounted on the medium mounting member 11 are fed to the downstream side (the +Y direction side) as a result of being picked up by the feeding roller 13 provided so as to be capable of rotating with respect to the lower portion unit 2. More specifically, as a result of the feeding roller 13 rotating while coming into contact with a surface of a sheet of paper P that faces the mounting surface 11a, the sheet of paper P is fed toward the downstream side. Accordingly, in the scanner 1, in a case in which a plurality of sheets of paper P are set in the feeding port 6, the sheets of paper P are fed toward the downstream side in order from a sheet of paper P on the mounting surface 11a side of the medium mounting member 11.

Additionally, the feeding roller 13 is disposed so that a portion thereof protrudes with respect to a paper sheet transport surface 29.

A transport roller pair 20, the image reading portion 21 as a "reading portion" that reads an image, and an ejection roller pair 22 are provided on the downstream side of the feeding roller 13. Sheets of paper P that are fed to the downstream side as a result of being nipped by the feeding roller 13 and the separation roller 14 are nipped by the transport roller pair 20, and transported to the image reading portion 21, which is positioned on the downstream side of the transport roller pair 20.

The transport roller pair 20 is provided with a transport driving roller 23 provided in the lower portion unit 2, and a transport driven roller 24 that is provided in the upper portion unit 3 and is driven to rotate with respect to the transport driving roller 23.

The image reading portion 21 is provided with an upper portion image reading sensor 25 provided on the upper portion unit 3 side, and a lower portion image reading sensor 26 provided on the lower portion unit 2 side. In the present embodiment, as one example, the upper portion image reading sensor 25 and the lower portion image reading sensor 26 are configured as contact image sensor modules (CISM).

After an image of a surface of at least one of the front surface and the rear surface of a sheet of paper P is read in the image reading portion 21, the sheet of paper P is nipped by the ejection roller pair 22 positioned on the downstream side of the image reading portion 21, and is ejected from an ejection port 8 provided on the apparatus front surface side of the lower portion unit 2.

A paper ejection tray 5 that is configured so as to be capable of being drawn out toward the apparatus front surface side from the ejection port 8, is provided in the lower portion unit 2. The paper ejection tray 5 can take on a state (FIG. 1) of being accommodated in the bottom portion of the lower portion unit 2, and a state (FIG. 2) of being drawn out to the apparatus front surface side. In the state in which the paper ejection tray 5 is drawn out, sheets of paper P ejected from the ejection port 8 are loaded on the paper ejection tray 5.

In addition, in the present embodiment, the ejection roller pair 22 is provided with an ejection driving roller 27 provided in the lower portion unit 2, and an ejection driven roller 28 that is provided in the upper portion unit 3 and is driven to rotate with respect to the ejection driving roller 27.

Additionally, in the present embodiment, the feeding roller 13, the transport driving roller 23, and the ejection driving roller 27 are driven in a rotational manner by at least a single driving source (not illustrated in the drawings) provided inside the lower portion unit 2.

Medium Mounting Member

Subsequently, the medium mounting member 11, which configures the medium feeding device 10, will be described in further detail with reference to FIG. 4.

As mentioned earlier, in the present example, the NFC substrate 32 and the Wi-Fi substrate 31, which perform wireless communication with another communication terminal, are provided in the medium mounting member 11. More specifically, the NFC substrate 32 and the Wi-Fi substrate 31 are provided in the inner portion of the medium mounting member 11.

The medium mounting member 11 (the opening/closing body 4) is formed so as to be capable of accommodating and so as to be capable of drawing out the supplementary paper support 15 in a hollow area, and the NFC substrate 32 and the Wi-Fi substrate 31 are provided in the space of the hollow area. The Wi-Fi substrate 31 is connected to a main circuit board 36 (FIG. 3) provided in the lower portion unit 2, via a flexible flat cable 35.

Additionally, the description "the wireless communication substrate 30 is provided in the inner portion of the medium mounting member 11" is not limited to the wireless communication substrate 30 being provided in the space of a hollow area formed in the medium mounting member 11, and also includes the wireless communication substrate 30 being in a state of being concealed by another member (for example, an edge guide, or the like) that configures the medium mounting member 11.

In this instance, it is also possible to provide the Wi-Fi substrate 31, which is connected to the main circuit board 36 using the flexible flat cable 35, in the lower portion unit 2, which is close to the main circuit board 36, but since a large number of constituent members that configuration the scanner 1 are accommodated in the inner portion of the lower portion unit 2, and the upper portion unit 3 (in which a large number of constituent members are accommodated in the same manner as that in the lower portion unit 2) is attached above the lower portion unit 2, there are cases in which the sensitivity of Wi-Fi communication is poor on the front surface side (the +Y side) of the scanner 1.

On the other hand, there are many cases in which a user performs operation from the front surface side of the scanner 1, and therefore, it is necessary for the sensitivity of Wi-Fi communication on the front surface side to be more favorable.

As a result of the Wi-Fi substrate 31, as the wireless communication substrate 30, being provided in at least a portion of the medium mounting member 11, which is positioned outside the housing 7, it is possible to dispose the wireless communication substrate 30 in a position in which there are few other constituent members that block wireless communication between the Wi-Fi substrate 31 and the other communication terminal. Accordingly, it is possible to suppress directivity of wireless communication in the Wi-Fi substrate 31.

In addition, when there are metallic materials such as sheet metal close to the NFC substrate 32, as the wireless communication substrate 30, there are cases in which near field communication is obstructed. As a result of the NFC substrate 32 being provided in the inner portion of the medium mounting member 11, since it is possible to dispose the NFC substrate 32 in a position in which there are few other constituent members in the periphery thereof, it is possible to reduce a concern of communication disturbance in the NFC substrate 32.

Furthermore, in a case in which the other communication terminal that performs wireless communication with the NFC substrate 32, is a medium, for example, a card, or the like, having a built-in IC chip, that can be mounted on the medium mounting member 11, since it is possible to perform wireless communication by merely setting the card on the medium mounting member 11, it is possible to configure a scanner 1 having high usability and convenience for a user.

Additionally, in the present example, since the medium feeding device 10 is a central paper feeding technique of the medium feeding device, the NFC substrate 32 is provided in the central portion in the width direction (the X axis direction) of the sheets of paper P.

In a case of a one side flush paper feeding technique in which one edge guide (for example, the +X side) moves with respect to the other edge guide (the −X side), which is fixed, it is desirable that the NFC substrate 32 be provided in the vicinity of the other edge guide, which is fixed.

Regardless of differences in the central paper feeding technique and the one side flush paper feeding technique, the Wi-Fi substrate 31 may be disposed in any position as long as the position is in the inner portion of the medium mounting member 11.

In addition, the NFC substrate 32 is provided inside a guiding region (a region represented by the reference symbol 33 in FIG. 4) of the edge guides 12 and 12 in the feeding direction of the sheets of paper P, which is between the pair of edge guides 12 and 12 (a region represented by the reference symbol 34 in FIG. 4) in the width direction of the sheets of paper P.

In the scanner 1, there are cases in which a medium in which wireless communication with the NFC substrate 32 is possible, is read. A card (hereinafter, referred to as an IC card) provided with an IC chip is an example of such a medium.

As a result of the NFC substrate 32 being provided in the guiding region 33 of the edge guides 12 and 12 in the feeding direction of the sheets of paper P, which is in the region 34 between the pair of edge guides 12 and 12, it is possible to more reliably perform wireless communication when the medium is set on the medium mounting member 11 in a case in which the communication terminal that performs wireless communication with the NFC substrate 32 is a medium (a sheet of paper P) that can be read by the scanner 1.

As a result of this, the NFC substrate 32 obtains information recorded on an IC chip of the IC card at the same time as reading by scanning the external appearance of the IC card in the scanner 1, and therefore, it is possible to store the information in association with the read data of the scanner 1.

Example 2

Figure 5:
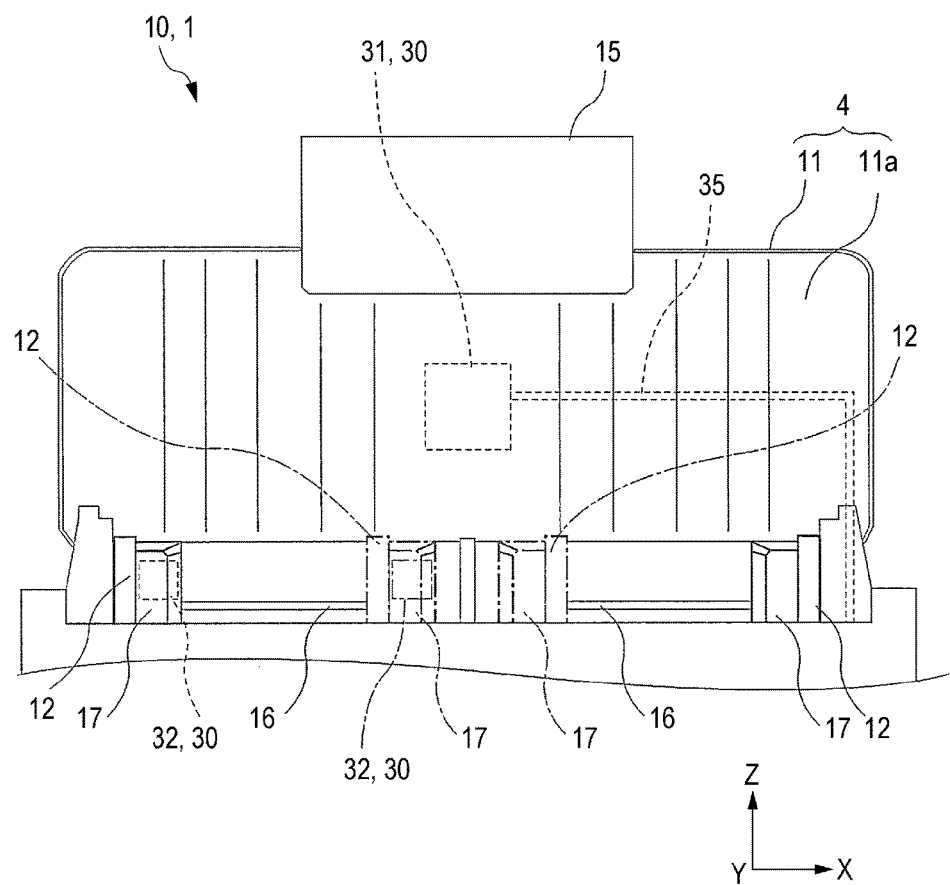
FIG. 5 is a plan view of a medium mounting member according to Example 2.
Figure 6:
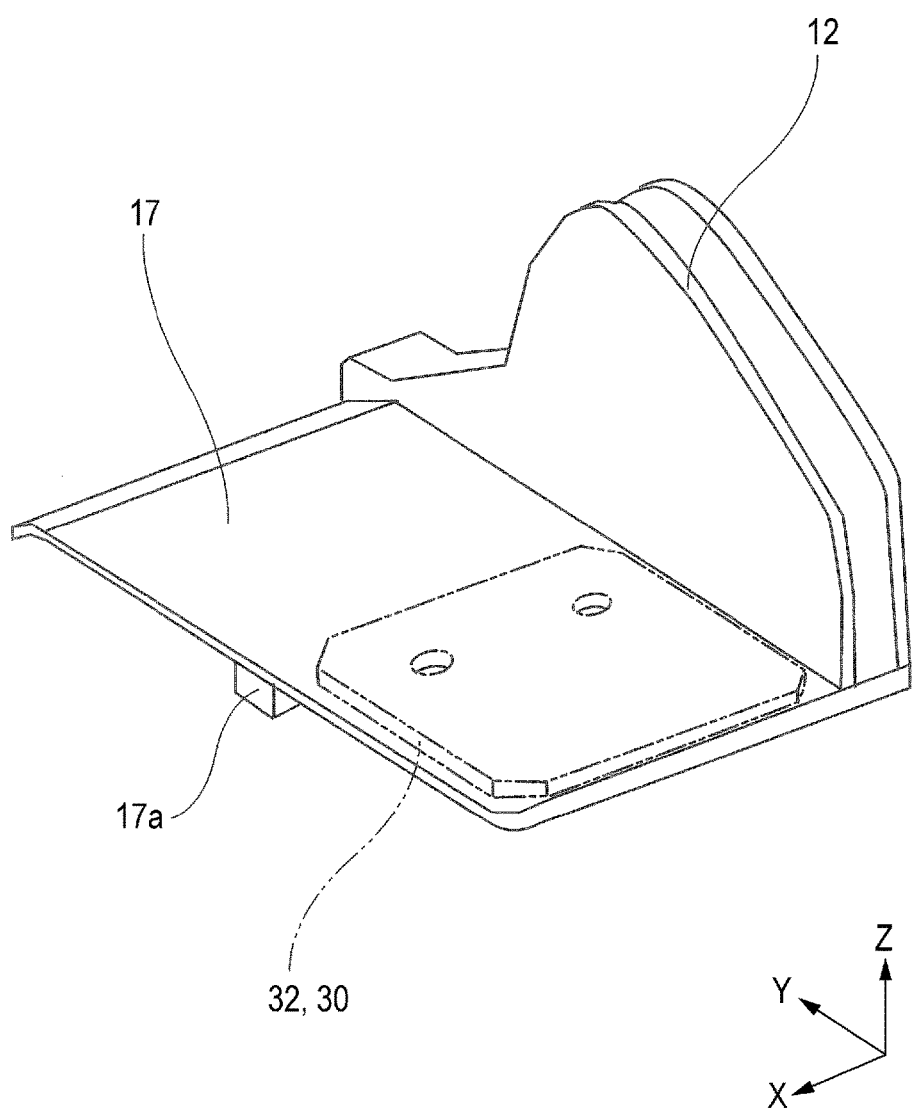
FIG. 6 is a perspective view that shows an edge guide according to Example 2.

In Example 2, another example of a medium mounting member in the medium feeding device will be described on the basis of FIG. 5 and FIG. 6. FIG. 5 is a plan view of a medium mounting member according to Example 2. FIG. 6 is a perspective view that shows an edge guide according to Example 2. In the present example, the same reference symbols will be given to the same configurations as those of Example 1, and descriptions of such configurations will be omitted.

In Example 2, the NFC substrate 32, as the wireless communication substrate 30, is provided in the sliding portion 17 of an edge guide 12 (−X side) provided in the medium mounting member 11.

More specifically, the NFC substrate 32 is provided on the rear surface (a surface that faces the medium mounting member 11) of the sliding portion 17 of the edge guide 12 (−X side), and the NFC substrate 32 is concealed and is not visible when the medium mounting member 11 is viewed in a planar manner in the manner of FIG. 5.

In the present example, since the NFC substrate 32 is provided in the sliding portion 17, the position of the NFC substrate 32 moves when the edge guides 12 and 12 are moved to match the size of a sheet of paper P that is set on the medium mounting member 11.

Additionally, in FIG. 5, the edge guides 12 and 12, which are in positions that correspond to a maximum width of a sheet of paper that can be read in the scanner 1, are shown with a solid line, and the edge guides 12 and 12 after movement to the inner side in the paper sheet width direction are shown with a dashed-dotted line.

As a result of the NFC substrate 32 being provided in the sliding portion 17 of an edge guide 12, it is even possible to reliably perform wireless communication with the NFC substrate 32 in a case in which the other communication terminal that performs wireless communication with the NFC substrate 32, is a medium (a sheet of paper P) that is read by the scanner 1 and the medium size thereof differs.

Additionally, it is also possible for the NFC substrate 32 to be provided in the +X side edge guide 12.

In addition, in a case of the one side flush paper feeding technique that fixes the position of one of the edge guides (for example, the −X side) and moves the other edge guide (the +X side) in a sliding manner, it is possible to provide the NFC substrate 32 in a sliding portion of the edge guide that moves.

In addition, it is also possible to provide a wireless communication substrate 30 other than the NFC substrate 32 in the sliding portion 17 of an edge guide 12.

Example 3

Figure 7:
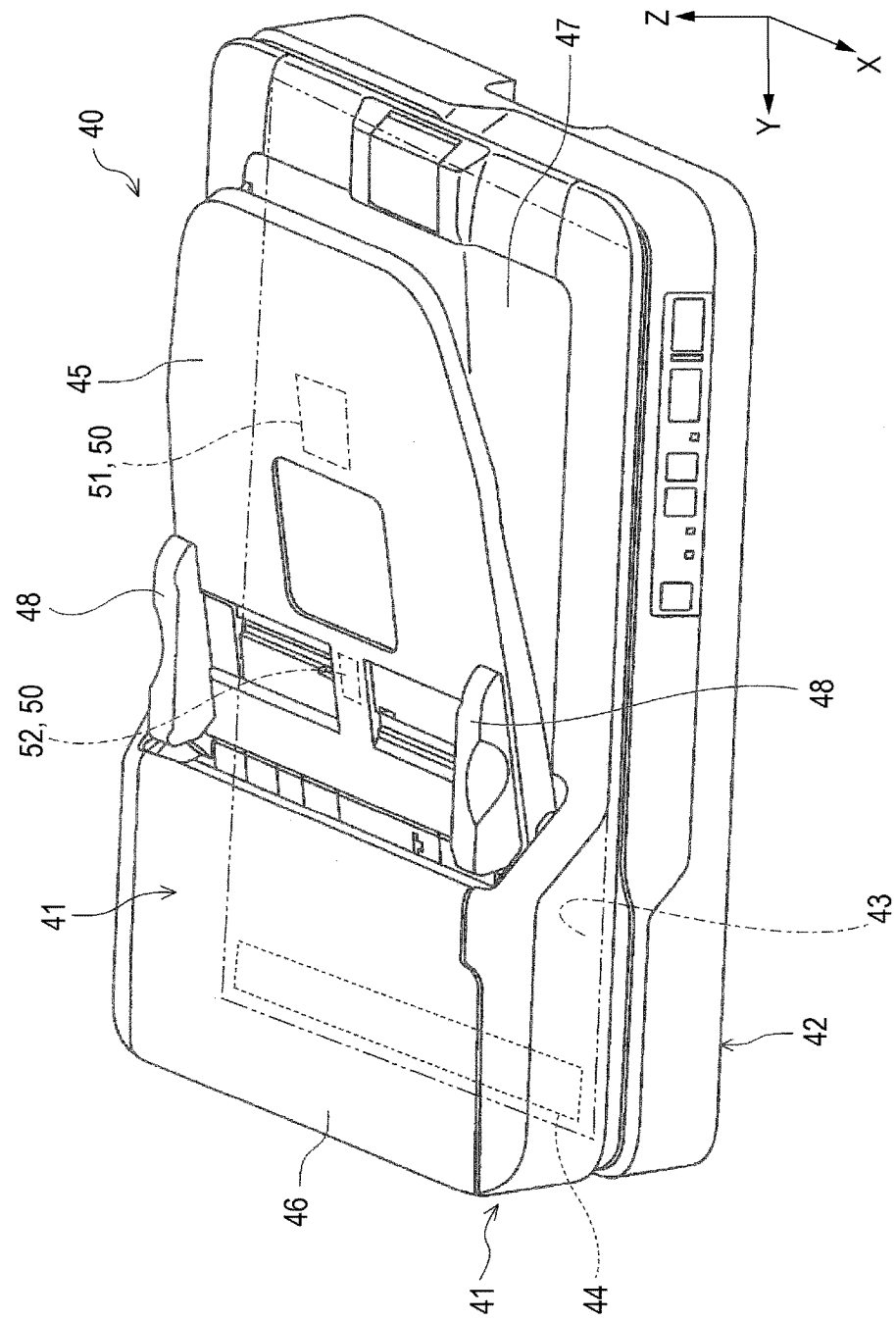
FIG. 7 is an external perspective view that shows a scanner according to Example 3.

For example, the medium feeding device according to the invention can also be provided in a scanner such as that shown in FIG. 7. FIG. 7 is an external perspective view that shows a scanner according to Example 3.

The scanner 40 is provided with an apparatus main body 42 that is provided with an image reading portion 44 in the inner portion thereof, and an auto document feeder (ADF) (hereinafter, referred to as an ADF 41) as a "medium feeding device". The ADF 41 is configured so as to be capable of switching between a posture (FIG. 7) that is closed with respect to a mounting surface 43 provided in the upper portion of the apparatus main body 42, and a posture (not illustrated in the drawings) in which the mounting surface 43 is open.

The ADF 41 is connected to the apparatus main body 42 via a hinge portion provided on the −X side of the apparatus main body 42 in FIG. 7 and not illustrated in the drawings, so as to be capable of opening and closing by revolving. That is, the ADF 41 opens and closes by revolving with respect to the apparatus main body 42 with the +X side end portion as a free end.

The ADF 41 is provided with a medium support tray 45 as a "medium mounting member", a medium transport portion 46 as a "medium feeding portion", and a medium ejection tray 47. The medium transport portion 46 transports a medium supported by the medium support tray 45 in the state of FIG. 7 in which the ADF 41 is closed with respect to the apparatus main body 42, and after a target reading surface of the medium is read by the image reading portion 44 on the mounting surface 43 provided in the upper portion of the apparatus main body 42, the medium is ejected toward the medium ejection tray 47.

A pair of edge guides 48 and 48 is provided in the medium support tray 45. In the present example, the edge guides 48 and 48 are also configured so that one edge guide (for example, the −X side) moves in an opposing direction following X movement of the other edge guide 48 (the +X side).

The scanner 40 is provided with a near field communication substrate 52 (hereinafter, referred to as an NFC 52), and a Wi-Fi substrate 51 as "wireless communication substrates 50", and the NFC substrate 52 and the Wi-Fi substrate 51 are provided in the medium support tray 45.

The NFC substrate 52 and the Wi-Fi substrate 51 can be provided in the inner portion of the medium support tray 45 configured in a hollow area in a similar manner to Example 1. In addition, it is also possible to provide the NFC substrate 52 and the Wi-Fi substrate 51 on the rear surface of the medium support tray 45.

Additionally, the invention is not limited to the above-mentioned embodiments, various alterations are possible within the range of the invention that is disclosed in the claims, and, naturally, such alterations are also included within the scope of the invention.

The entire disclosure of Japanese Patent Application No. 2016-056606, filed Mar. 22, 2016 is expressly incorporated by reference herein.

What is claimed is:

1. A medium feeding device comprising:
   a housing;
   a medium mounting portion on which a medium is mounted;
   a medium feeding portion that is attached to an inner portion of the housing and feeds the medium that is mounted on the medium mounting portion; and
   a wireless communication substrate that is configured to perform wireless communication with another communication terminal,
   wherein the wireless communication substrate is attached to the medium mounting portion provided with a pair of edge guides.

2. An image reading apparatus comprising:
   a reading portion that reads a medium; and
   the medium feeding device according to claim 1, which feeds the medium toward the reading portion.

3. The image reading apparatus according to claim 2, further comprising:
   a near field communication portion as the wireless communication portion.

4. The image reading apparatus according to claim 2, further comprising:
   a Wi-Fi module as the wireless communication portion.

5. A medium feeding device comprising:
   a housing;
   a medium mounting portion on which a medium is mounted;
   a medium feeding portion that is attached to an inner portion of the housing and feeds the medium that is mounted on the medium mounting; and
   a wireless communication substrate that is configured to perform wireless communication with another communication terminal,
   wherein the wireless communication substrate is attached to the medium mounting member,
   wherein the medium mounting member is provided with a pair of edge guides that guides both side edges of the medium in a width direction that intersects a feeding direction, and
   wherein the wireless communication portion is provided inside a guiding region of the edge guides in the feeding direction, the guiding region being between the pair of edge guides in the width direction.

6. The medium feeding device according to claim 5, wherein either one of the edge guides is provided with a sliding portion that is capable of sliding on a mounting surface of the medium mounting member, on an inner side of the corresponding edge guide, and
wherein the wireless communication portion is provided in the sliding portion.

\* \* \* \* \*